(12) United States Patent
Misawa

(10) Patent No.: US 10,861,137 B2
(45) Date of Patent: Dec. 8, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Reiji Misawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 46 days.

(21) Appl. No.: 16/122,645

(22) Filed: Sep. 5, 2018

(65) Prior Publication Data

US 2019/0087940 A1 Mar. 21, 2019

(30) Foreign Application Priority Data

Sep. 15, 2017 (JP) .................................. 2017-178107
Mar. 29, 2018 (JP) .................................. 2018-065506

(51) Int. Cl.
*G06T 5/00* (2006.01)
*G06T 3/40* (2006.01)
*G06T 5/40* (2006.01)
*G06T 3/60* (2006.01)
*G03G 15/00* (2006.01)
*G06K 15/02* (2006.01)

(52) U.S. Cl.
CPC ......... *G06T 5/002* (2013.01); *G03G 15/5087* (2013.01); *G06K 15/027* (2013.01); *G06T 3/4084* (2013.01); *G06T 3/608* (2013.01); *G06T 5/009* (2013.01); *G06T 5/40* (2013.01); *G03G 15/5025* (2013.01); *G03G 2215/00805* (2013.01); *G06T 2207/20021* (2013.01)

(58) Field of Classification Search
CPC .............................. G06T 5/002; G06T 3/4084
See application file for complete search history.

(56) References Cited

U.S. PATENT DOCUMENTS

2008/0137965 A1* 6/2008 Fujita ................... H04N 1/4097
382/209
2010/0020205 A1* 1/2010 Ishida ..................... G06T 5/008
348/241

FOREIGN PATENT DOCUMENTS

JP 2009-063694 A 3/2009

OTHER PUBLICATIONS

Isamu Motoyoshi, et al.—Image statistics and the perception of surface qualities—Nature Publishing Group, vol. 447, 206-209, May 10, 2007.

* cited by examiner

*Primary Examiner* — Tuan H Nguyen
(74) *Attorney, Agent, or Firm* — Canon U.S.A., Inc. IP Division

(57) ABSTRACT

An apparatus includes a resolving unit configured to resolve input image data into image data for each frequency band, an acquisition unit configured to acquire skewness corresponding to the resolved image data resolved by the resolving unit, wherein the skewness is acquired from a histogram corresponding to each of the resolved image data, and an adjustment unit configured to determine image data to be processed, out of the resolved image data based on the acquired skewness acquired and perform gain adjustment on the determined image data.

24 Claims, 22 Drawing Sheets

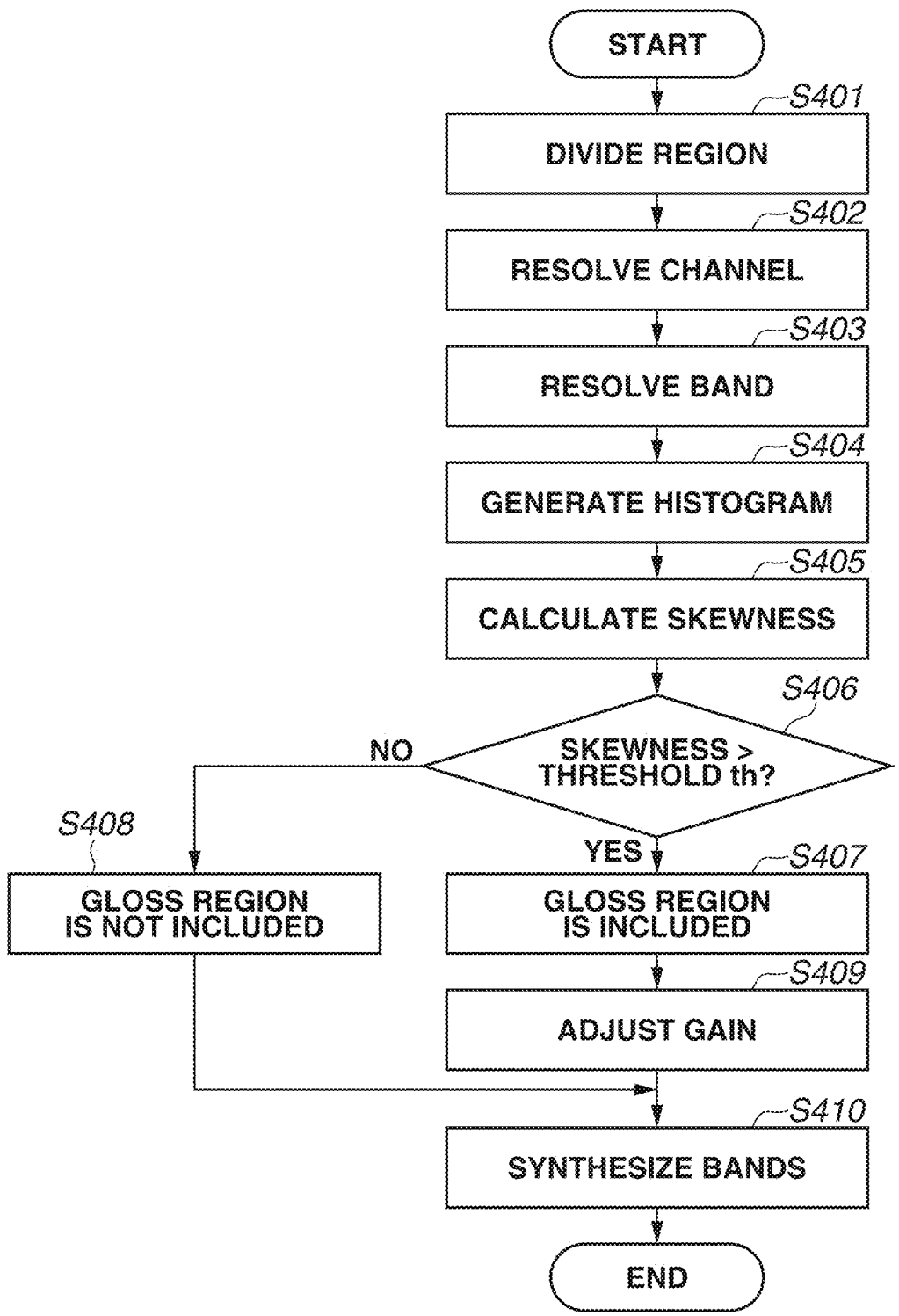

FIG.10

| BAND | SKEWNESS |
|---|---|
| BAND 0 | -0.6 |
| BAND 1 | -0.2 |
| BAND 2 | 0.8 |
| BAND 3 | 2.1 |

1301   1302   1303   1304   1305

INPUT IMAGE DATA   BAND 0   BAND 1   BAND 2   BAND 3

FIG.20A

| GLOSS INTENSITY | GAIN COEFFICIENT |
|---|---|
| 0 | 1.0 |
| +1 | 1.2 |
| +2 | 1.4 |

FIG.20B

| GLOSS RANGE | NUMBER OF PROCESSED BANDS | BAND |
|---|---|---|
| 0 | 1 | BAND 3 |
| +1 | 2 | BAND 2, 3 |

FIG.20C

| GLOSS ADJUSTMENT | GAIN COEFFICIENT | NUMBER OF PROCESSED BANDS | BAND |
|---|---|---|---|
| 0 | 1.0 | 1 | BAND 3 |
| +1 | 1.2 | 1 | BAND 3 |
| +2 | 1.4 | 1 | BAND 3 |
| +3 | 1.6 | 1 | BAND 3 |

FIG.20D

| GLOSS ADJUSTMENT | GAIN COEFFICIENT | NUMBER OF PROCESSED BANDS | BAND |
|---|---|---|---|
| +3 | 1.4 | 2 | BAND 2, 3 |

FIG.22A

| SIGNAL VALUE | FREQUENCY |
|---|---|
| 0 (BLACK PIXEL) | 200 |
| 100 | 100 |
| 200 | 300 |
| 255 (WHITE PIXEL) | 100 |

FIG.22B

| SIGNAL VALUE | FREQUENCY |
|---|---|
| 0 (BLACK PIXEL) | 200 |
| 120 (= 100 × 1.2) | 100 |
| 240 (= 200 × 1.2) | 300 |
| 255 (WHITE PIXEL) | 100 |

FIG.22C

| SIGNAL VALUE | FREQUENCY |
|---|---|
| 0 (BLACK PIXEL) | 200 |
| 160 (= 100 × 1.6) | 100 |
| 255 (WHITE PIXEL) | 400 | ary embodiments to be described below are merely examples, and are not intended to limit the scope of the disclosure.

IMAGE PROCESSING APPARATUS, IMAGE PROCESSING METHOD, AND STORAGE MEDIUM

BACKGROUND OF THE INVENTION

Field of the Invention

The aspect of the embodiments relates to an image processing apparatus, an image processing method, and a storage medium that each perform control to express glossiness in an output image.

Description of the Related Art

In recent years, various approaches have been made in order to detect texture such as transparency, gloss, and metallic feeling on a surface of an object, and express the detected texture on an image. Japanese Patent Application Laid-Open No. 2009-63694 discusses a technology of determining whether an image includes a glossy part and performing control so as to express a glossy image without lowering luminance of the entire image in order to control display of the image corresponding to an image signal in an image display apparatus including a backlight. As a gloss determination method for determining whether the image includes a glossy part, a method of calculating glossiness included in the image with use of skewness of luminance histogram acquired from image data is used. The method is discussed in "Image statistics and the perception of surface qualities", Nature 447, 206-209, (2007) (Non-patent Literature 1).

Non-patent Literature 1 discusses high correlation of physical gloss, brightness, and skewness of luminance histogram with perceptive gloss and brightness through psychophysical experiment.

According to this correlation, for example, the luminance histogram acquired from the image data is skewed in a positive direction (appearance frequencies of pixels are gently spread toward higher luminance) as gloss on a surface of the image becomes higher. Accordingly, it is possible to evaluate glossiness on the surface of the image based on the skewness of the luminance histogram.

On the other hand, it is desirable to express the texture (glossiness) in addition to color feeling and gradation also in an image printed by an image processing apparatus such as a multifunction peripheral and a printer.

In a case where control to express glossiness in the image (gloss control) is performed, when gain adjustment is performed on image signals of all frequency bands (hereinafter, bands) in image data that is determined as glossy, the gain of the image data in a band that does not require gain adjustment may be adjusted. For example, when the gain adjustment is performed on the image data that is determined as glossy and includes a low frequency and a high frequency, noise of a high-frequency component appears to be increased and gloss control on the image may not be appropriately performed.

SUMMARY OF THE INVENTION

According to an aspect of the embodiments, an apparatus includes a resolving unit configured to resolve input image data into image data for each frequency band, an acquisition unit configured to acquire skewness corresponding to the resolved image data resolved by the resolving unit, wherein the skewness is acquired from a histogram corresponding to each of the resolved image data, and an adjustment unit configured to determine image data to be processed, out of the resolved image data based on the acquired skewness acquired by the acquisition unit and perform gain adjustment on the determined image data.

Further features of the disclosure will become apparent from the following description of exemplary embodiments with reference to the attached drawings.

BRIEF DESCRIPTION OF THE DRAWINGS

FIG. 4 is a flowchart according to the first exemplary embodiment.

FIG. 10 is a diagram illustrating skewness of the respective bands according to the first exemplary embodiment.

FIGS. 20A to 20D are explanatory diagrams of the gloss adjustment according to the second exemplary embodiment and the third exemplary embodiment.

FIGS. 22A to 22C are explanatory diagrams of saturated pixel calculation according to the third exemplary embodiment.

DESCRIPTION OF THE EMBODIMENTS

Exemplary embodiments of the disclosure are described below with reference to drawings.

Figure 1:
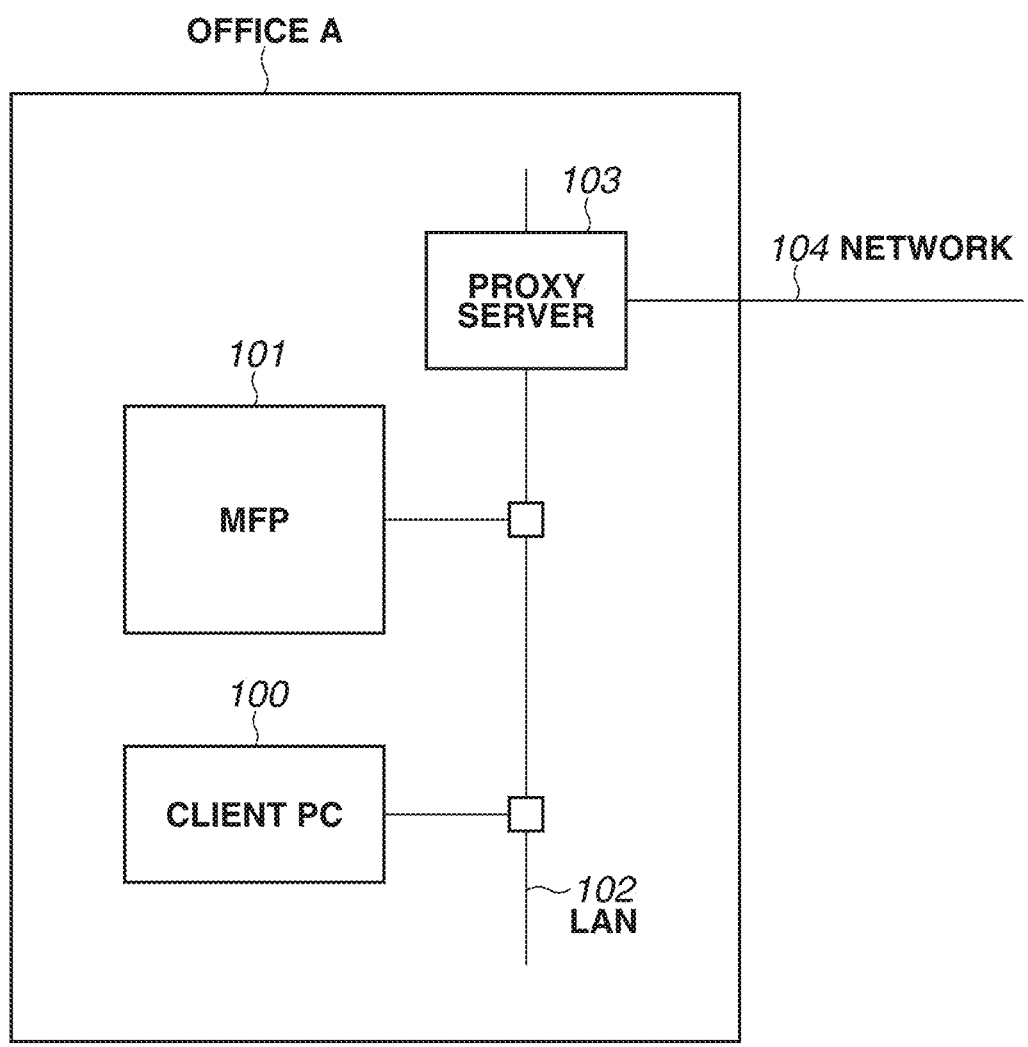
FIG. 1 is a block diagram illustrating an image processing system according to an exemplary embodiment.

A first exemplary embodiment is described below. In FIG. 1, a multifunction peripheral (MFP) 101 that achieves a plurality of kinds of functions (e.g., copy function, print function, and transmission function) is connected to a local area network (LAN) 102 built in an office A. The LAN 102 is also connected to an external network 104 through a proxy server 103. A client personal computer (PC) 100 receives data transmitted from the MFP 101 and uses the functions of the MFP 101 through the LAN 102. For example, the client PC 100 transmits print data to the MFP 101 to make a print document based on the print data by the MFP 101. The configuration in FIG. 1 is an example, and a plurality of offices including components similar to those of the office A may be connected to the external network 104. Further, the external network 104 is typically a communication network that is realized by, for example, the Internet, a LAN, a wide area network (WAN), a telephone line, a dedicated digital line, an asynchronous transfer mode (ATM) line, a frame relay line, a satellite communication line, a cable television line, and a radio line for data broadcasting. Any communication network is usable as long as the communication network can perform data transmission/reception. Further, various kinds of terminals of the client PC 100 and the proxy server 103 include standard components to be mounted on a general purpose computer. Examples of the standard components include a central processing unit (CPU), a random access memory (RAM), a read-only memory (ROM), a hard disk drive, an external storage device, a network interface, a display, a keyboard, and a mouse that are not illustrated.

Figure 2:
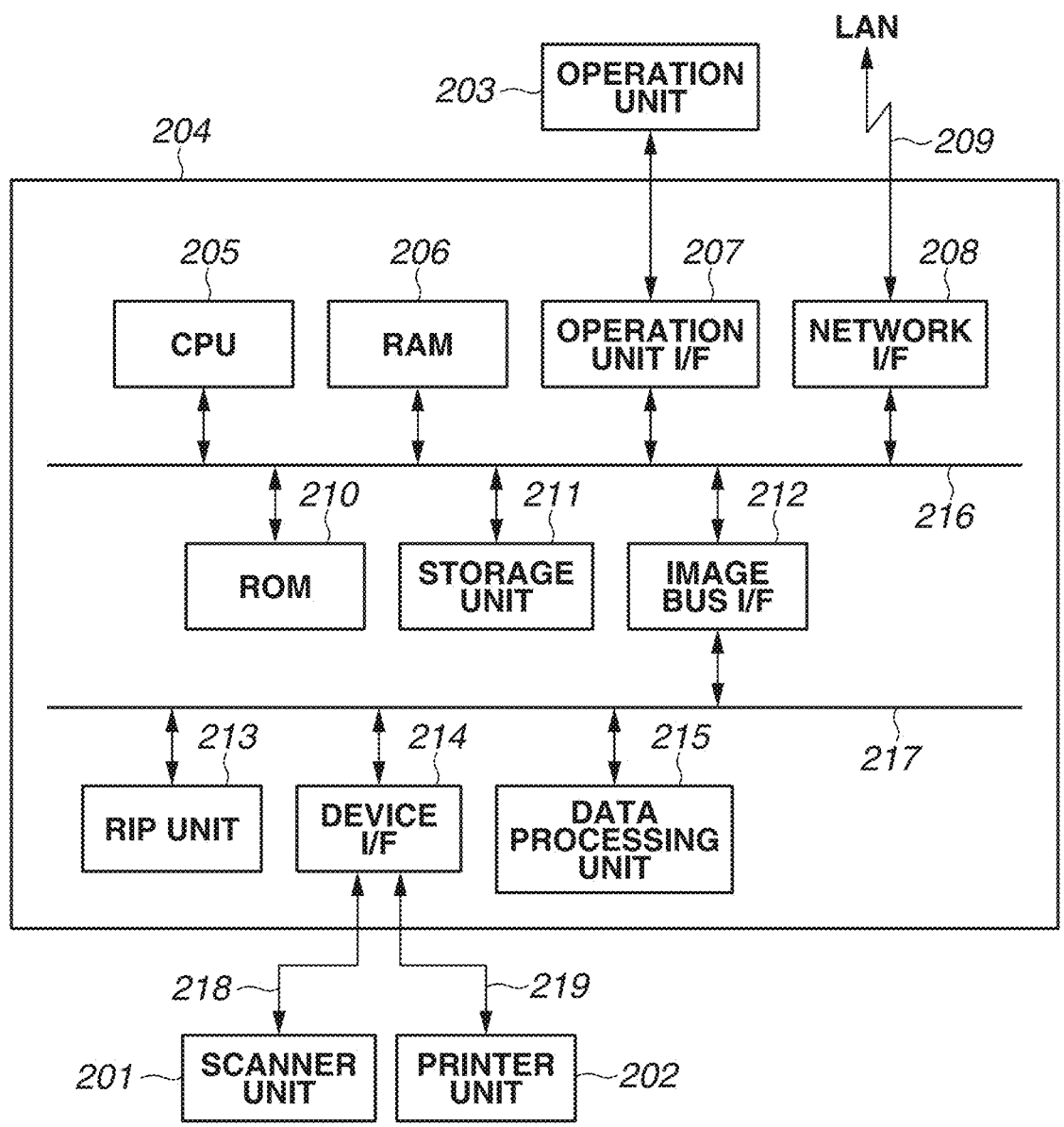
FIG. 2 is a diagram illustrating a configuration of a multifunction peripheral (MFP) according to the present exemplary embodiment.

FIG. 2 is a diagram illustrating a detailed configuration of the MFP 101. The MFP 101 includes a scanner unit 201 serving as an image data input device, a printer unit 202 serving as an image data output device, a control unit 204 controlling the whole of the MFP 101, and an operation unit 203 serving as a user interface. The control unit 204 is a controller that performs input/output of image information and device information by connecting to the scanner unit 201, the printer unit 202, and the operation unit 203, and a LAN 209 on the other side. A CPU 205 is a processor that controls the whole of the system. A RAM 206 serves as a system work memory for operation of the CPU 205, and also serves as an image memory to temporarily hold image data. A ROM 210 is a boot ROM that holds programs such as a boot program of the system. A storage unit 211 is a non-volatile storage device such as a hard disk drive, and holds system control software and image data. An operation unit interface (I/F) 207 is an interface unit working with the operation unit (UI) 203, and provides, to the operation unit 203, image data to be displayed on the operation unit 203. Further, the operation unit I/F 207 transmits, to the CPU 205, information instructed by a user of the image processing apparatus through the operation unit 203. A network I/F 208 connects the image processing apparatus to the LAN 209, and performs input/output of data (e.g., transmits and receives binary image data to and from other apparatus). The above-described devices are disposed on a system bus 216.

Further, an image bus interface 212 is a bus bridge that connects the system bus 216 and an image data bus 217 and converts a data structure. The image data bus 217 transfers image data at high speed. For example, the image data bus 217 includes a peripheral component interconnect (PCI) bus or conforms to IEEE1394. The following devices are disposed on the image data bus 217. A raster image processor (RIP) 213 realizes so-called rendering processing of analyzing a page description language (PDL) code and developing the PDL code into a bitmap image with specified resolution. A device I/F 214 is connected to the scanner unit 201 as the image data input device through a signal line 218, and to the printer unit 202 as the image data output device through a signal line 219. The device I/F 214 performs conversion of synchronous/asynchronous system of image data. A data processing unit 215 performs gloss determination and gloss control of image data.

Further, the data processing unit 215 may decompress compressed data received through the network I/F 208 and the LAN 209. The decompressed image is transmitted to the printer unit 202 through the device I/F 214, and is printed. The data processing unit 215 is described in detail below.

<Description of Data Processing Unit 215>

Figure 3:
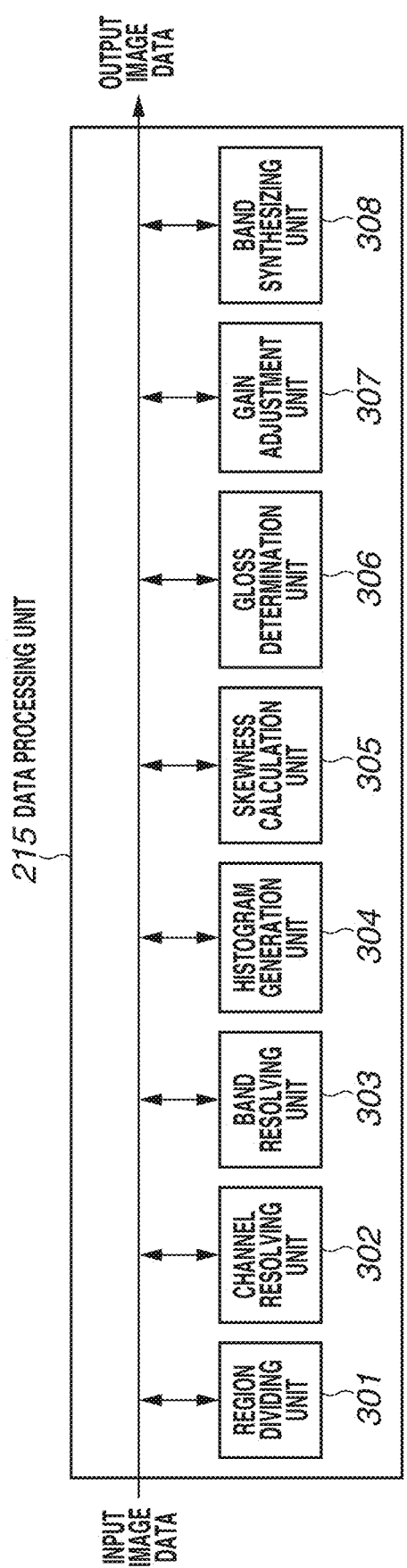
FIG. 3 is a block diagram illustrating a data processing unit according to a first exemplary embodiment.

Next, a configuration of each of a gloss determination unit and a gloss control unit realized by the data processing unit 215 in FIG. 2 is described with reference to a block diagram in FIG. 3. The data processing unit 215 may function as each processing unit in FIG. 3 when the processor executes a computer program, or a part or all of the processing units may be configured by hardware such as an application specific integrated circuit (ASIC) and an electronic circuit.

Figure 11:
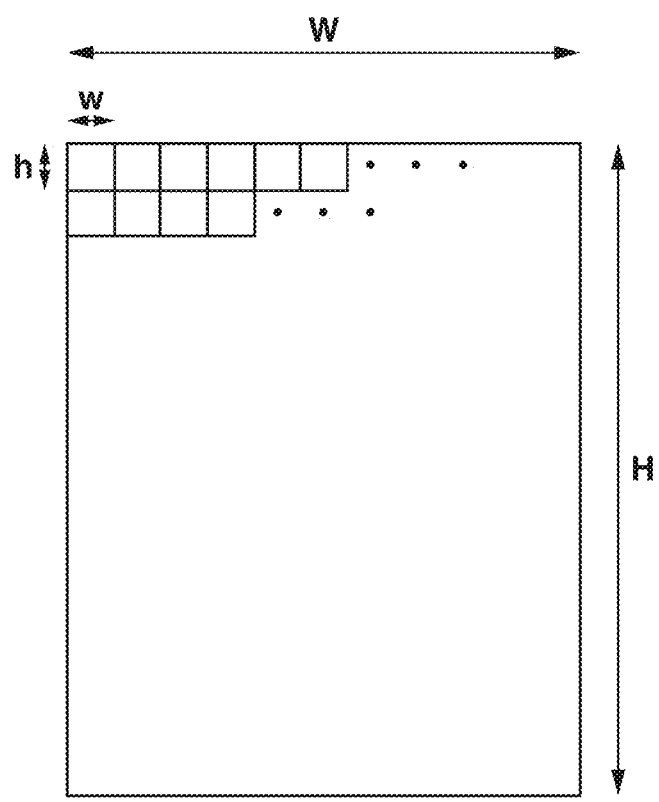
FIG. 11 is a diagram to explain region division according to the first exemplary embodiment.

A region dividing unit 301 divides input image data into rectangular units or into regions in optional shapes. FIG. 11 illustrates an example in a case where the input image data is divided into rectangular units. FIG. 11 is a schematic diagram of the input image data having a width W and a height H. The region dividing unit 301 divides the input image data into rectangular units having a width w and a height h. An example in which an image of an orange as a fruit is used as the input image data is described below with reference to FIGS. 5A to 5D.

A channel resolving unit 302 performs channel resolving on each region of the color image data divided by the region dividing unit 301. In the present exemplary embodiment, as the channel resolving, resolving of each region of the color image data into components of three colors R, G, and B is described; however, the channel resolving is not limited thereto, and each region may be resolved into, for example, color components of LaB or YUV.

A band resolving unit 303 resolves each image data of all channels resolved by the channel resolving unit 302, into image data of a plurality of different frequency bands.

Figure 8:
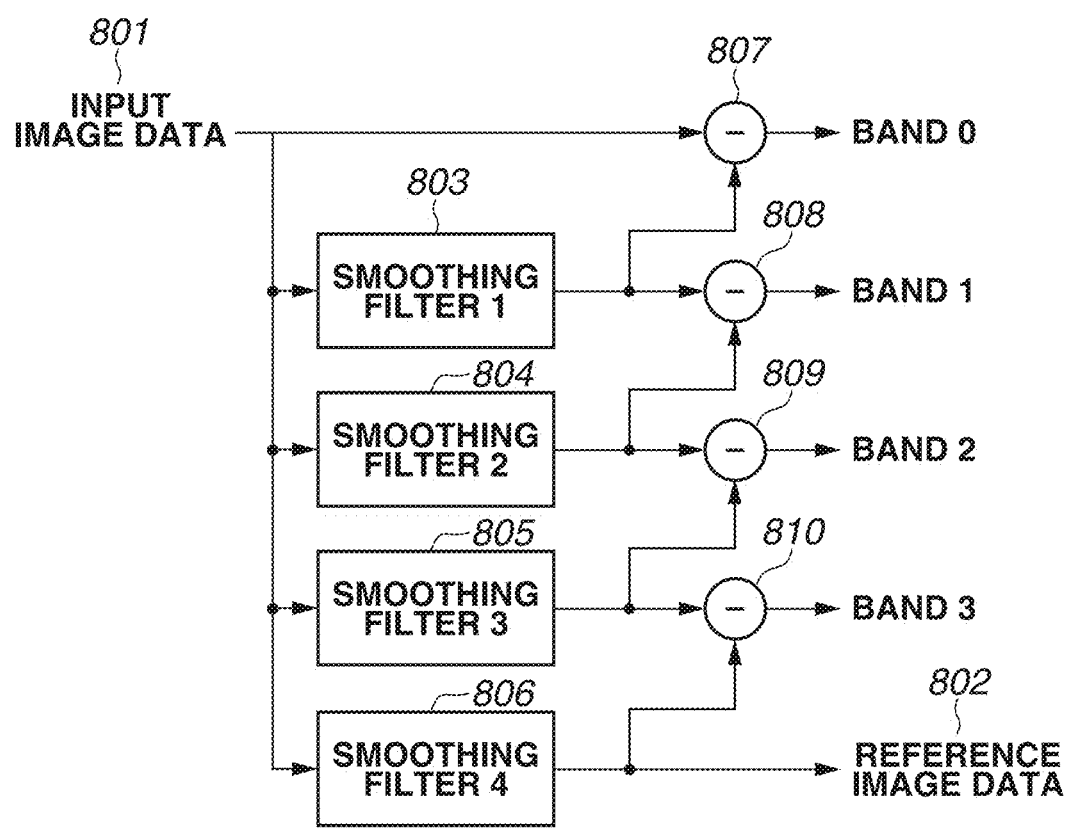
FIG. 8 is a diagram to explain band resolving according to the first exemplary embodiment.

The band resolving according to the present exemplary embodiment is described with reference to FIG. 8. Input image data 801 indicates image data as a target of channel resolving by the channel resolving unit 302. Smoothing filters 803 to 806 are smoothing filters (low-pass filters) 1 to 4, and each perform, on the input image data 801, filter processing corresponding to a smoothing degree of each filter. The smoothing degree is a degree of processing (smoothing processing) for smoothing a variation by reducing a difference of signal values included in the image data. The processing is performed such that the variation of each signal value included in the image data is more smoothed as the smoothing degree becomes larger. Among the smoothing filters 1 to 4, the smoothing filter 1 is a smoothing filter with the weakest smoothing degree, and the smoothing filter 4 is a smoothing filter with the strongest smoothing degree. The smoothing degree is increased in order of the smoothing filters 1, 2, 3, and 4.

Each of the smoothing filters is not limited to the low-pass filter, and may be an edge-preserving smoothing filter (bilateral filter or guided filter).

Reference numerals 807 to 810 indicate calculation of a difference of the signal values included in the image data processed by the smoothing filters described above. First, a difference 807 between the signal value included in the input image data and the signal value of the image data processed by the smoothing filter 1 is calculated to obtain image data of a band 0 from the process target image data. Next, a difference 808 between the signal value included in the image data processed by the smoothing filter 1 and the signal value included in the image data processed by the smoothing filter 2 is calculated to obtain image data of a band 1 from the process target image data. Subsequently, image data of a band 2 and image data of a band 3 are obtained from the process target image data in a similar manner. Among the bands 0 to 3, the image data of the band 0 is the image data of the highest band (high frequency) out of the process target image data, and the image data of the band 3 is the image data of the lowest band (low frequency) out of the process target image data. The band of the image data becomes lower in order of the bands 0, 1, 2, and 3.

Reference image data 802 is image data used for band composition described below. Accordingly, the input image data 801 is obtained by adding, to the reference image data 802, the image data of the band 0, the image data of the band 1, the image data of the band 2, and the image data of the band 3.

As described above, the band resolving unit 303 resolves the input image data to be processed, into image data of the plurality of different bands. The band resolving may be performed by a well-known method such as wavelet transformation.

A histogram generation unit 304 generates a histogram of the image data in each of the bands resolved by the band resolving unit 303. In this example, the histogram indicates frequency distribution in which a lateral axis indicates an image signal value or a signal value difference, and a vertical axis indicates a frequency.

A skewness calculation unit 305 acquires skewness for each channel/band from the histogram generated by the histogram generation unit 304. The skewness may be acquired with use of a common numerical expression as represented by, for example, the following expression 1.

$$\text{Skewness} = \Sigma(Xi - X\text{ave})^3 / N \times S^3 \quad \text{(Expression 1)}$$

where N is the number of pieces of data, Xi is a value of each data, Xave is an arithmetic average, and S is a standard deviation.

The skewness indicates a degree of skew of a graph. When the skewness is a positive value larger than zero, the graph is shifted to left. In contrast, when the skewness is a negative value smaller than zero, the graph is shifted to right. In the case of no shift, the graph has normal distribution.

In a case where the skewness of the histogram obtained from the image data has a positive value, it is determined that the image corresponding to the image data is glossy. In contrast, in a case where the skewness of the histogram obtained from the image data has a negative value, it is determined that the image corresponding to the image data is not glossy.

A gloss determination unit 306 determines whether the process target image data is image data including a gloss region, based on the skewness for each channel/band obtained by the skewness calculation unit 305.

In the present exemplary embodiment, since the band resolving is performed by the band resolving unit 303, it is determined whether a region is glossy based on each band. When it is determined that the region is glossy in a band in at least one of R, G, and B channels, it is determined that the image corresponding to the image data of the relevant band in the R, G, and B channels includes a gloss region.

A gain adjustment unit 307 multiplies a pixel signal included in the image data of each band resolved by the band resolving unit 303, by a predetermined coefficient based on the determination result of the gloss determination unit 306. As a result, the gain adjustment is performed on the image data. In one embodiment the gain adjustment is performed on the image data of the same band in all of the RGB channels. If the gain adjustment is performed only on the image data of one band in one channel, color balance in the input image data after the adjustment is lost.

The predetermined coefficient in the gain adjustment is a positive value. For example, in a case where the coefficient is larger than one, the signal value of the image data is amplified. Accordingly, glossiness expressed by the image is increased (gloss up). In contrast, in a case where the predetermined coefficient in the gain adjustment is smaller than one, the signal value is reduced. As a result, the glossiness expressed by the image is suppressed (gloss down).

Figure 12:
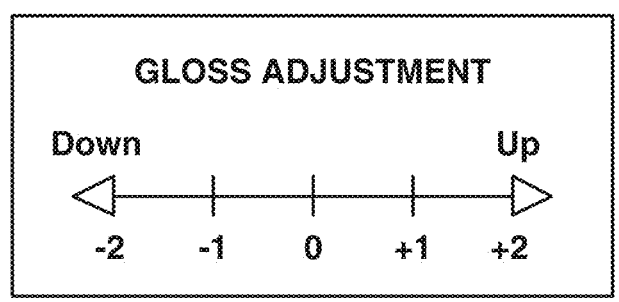
FIG. 12 illustrates a user interface (UI) screen for gloss adjustment according to the first exemplary embodiment.

FIG. 12 is a UI screen for gloss adjustment according to the present exemplary embodiment, and the UI screen is displayed on the operation unit 203 in FIG. 2. A setting value for gloss adjustment is previously designated by an operator, for example, when image data held by the client PC 100 or the image data held by the storage unit 211 is printed.

When a setting value "+1" or "+2" is designated by the operator, the designation indicates gloss up. As a result, glossiness expressed by a region that has been determined as the gloss region included in the image to be processed, is increased. When a setting value "4" or "−2" is designated, the designation indicates gloss down. As a result, glossiness expressed by the region that has been determined as the gloss region included in the image to be processed, is suppressed. An example of a fruit in which an image of "orange" is used as the input image data is described below with reference to FIG. 14.

The coefficients for gain adjustment corresponding to the setting values "−2" to "+2" of the gloss adjustment are, for example, "0.6", "0.8", "1.0", "1.2", and "1.4", respectively; however, the coefficients are not limited thereto.

A band synthesizing unit 308 synthesizes the image data of the band subjected to the gain adjustment by the gain adjustment unit 307, the image data of the band that has been determined as nonglossy (not including gloss region) by the gloss determination unit 306, and the reference image data obtained through resolving by the band resolving unit 303. As a result, the band synthesizing unit 308 generates output image data.

Figure 5A:
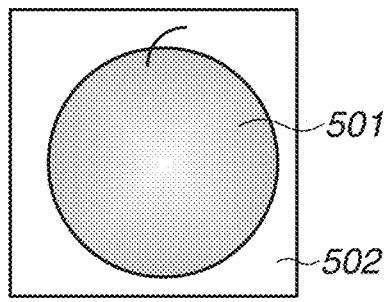
FIGS. 5A to 5D each illustrate an example of an input image according to the first exemplary embodiment.

FIG. 4 is a flowchart for explaining the gloss determination and the gloss control by the data processing unit 215. A program that executes the flowchart is held by the ROM 210 or the storage unit 211 in FIG. 2, and is executed by the CPU 205. The CPU 205 can exchange data with the data processing unit 215 through the image bus interface 212, the system bus 216, and the image data bus 217. Further, description will be given by appropriately referring to FIG. 5A to FIG. 10. FIG. 5A illustrates an example of the input image data according to the present exemplary embodiment, and a region 501 represents an image of "orange" as a fruit. A color of the image is orange, and a surface of the image presents a glossy state. A region 502 represents a background image and a color thereof is white.

Figure 5B:
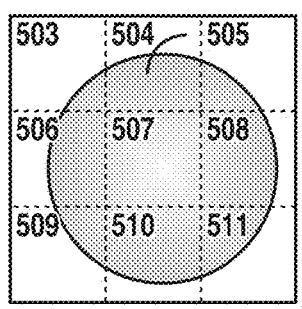

First, in step S401, the region dividing unit 301 divides the entire region of input image data 500 obtained by receiving the input image, into rectangular units or into regions in optional shapes. FIG. 5B illustrates an example in which the input image data 500 illustrated in FIG. 5A is divided into rectangular units. In FIG. 5B, the input image data 500 is divided into rectangular units as illustrated by regions 503 to 511. Accordingly, for example, the region 507 includes only a region representing "orange" of the fruit, whereas the region 510 includes an image region representing "orange" of the fruit and a region representing the background image in a mixed state.

Figure 5C:
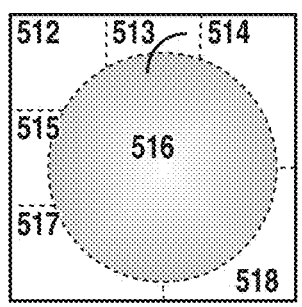

On the other hand, a known method may be used to divide the region into regions in optional shapes. For example, regions of similar colors may be continuously integrated to finally form one region of similar colors. FIG. 5C illustrates an example in which the input image data 500 as illustrated in FIG. 5A is divided into regions in optional shapes. In FIG. 5C, the input image data 500 is divided into regions in optional shapes as illustrated by regions 512 to 518. Therefore, for example, the image can be divided into a region representing "orange" of the fruit and a region representing the background image. When this method is used, however, processing load may become larger than the method of dividing the region into rectangular units, and processing accuracy may be deteriorated. In the present exemplary embodiment, the processing of dividing the input image data into rectangular units is used. Each of the rectangular units may have an optional size.

Figure 5D:
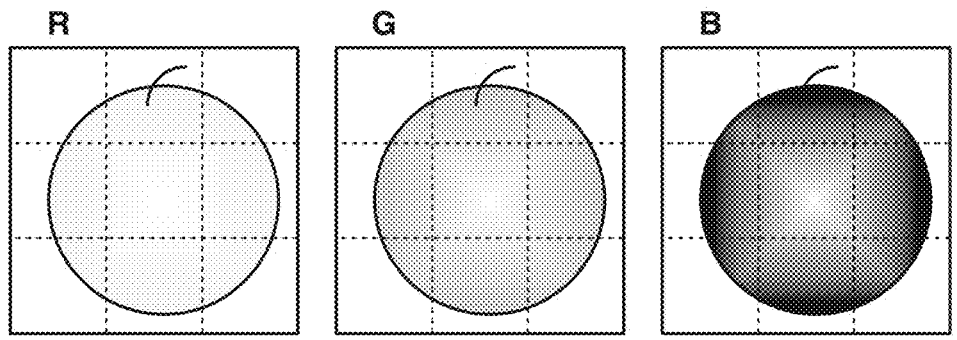

Next, in step S402, the channel resolving unit 302 performs channel resolving on each of the regions of the color image data divided by the region dividing unit 301. FIG. 5D illustrates a state where the image data in FIG. 5B is divided into image data of three color components of an R component, a G component, and a B component. In actual processing, it is unnecessary to generate image data resolved into the three color components of the R component, the G component, and the B component as illustrated in FIG. 5D, and it is sufficient to refer to signal values of each of the R, G, and B color components from the image data divided into the rectangular units in FIG. 5B.

Next, in step S403, the band resolving unit 303 resolves the image data of all channels resolved in step S402, into image data of different bands.

Figure 6:
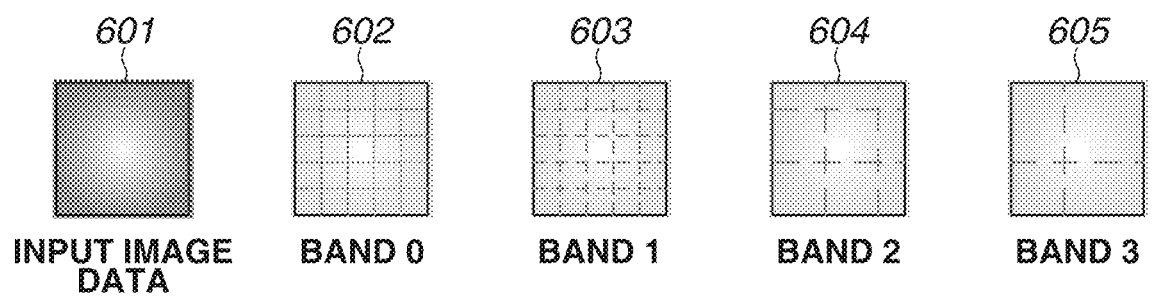
FIG. 6 is a diagram illustrating images in respective bands according to the first exemplary embodiment.

FIG. 6 is a schematic diagram illustrating, as an example, a state where the input image data of one channel is resolved into image data of some bands. Image data 601 corresponds to a rectangle at a center of the image data of the B channel in FIG. 5D. Image data 602 to 605 respectively correspond to image data of bands 0 to 3 that are obtained by resolving the image data 601 as the input image data by the band resolving unit 303. The image data 602 indicates the image data of the band 0 in FIG. 8, the image data 603 indicates the image data of the band 1 in FIG. 8, the image data 604 indicates the image data of the band 2 in FIG. 8, and the image data 605 indicates the image data of the band 3 in FIG. 8.

Vertical and lateral dashed lines in each of the image data 602 to 605 in the figure schematically represent a level of a frequency. The image data of the band 0 is the image data of the highest band (high frequency) of the input image data, and the image data of the band 3 is the image data of the lowest band (low frequency) of the input image data.

Figure 13:
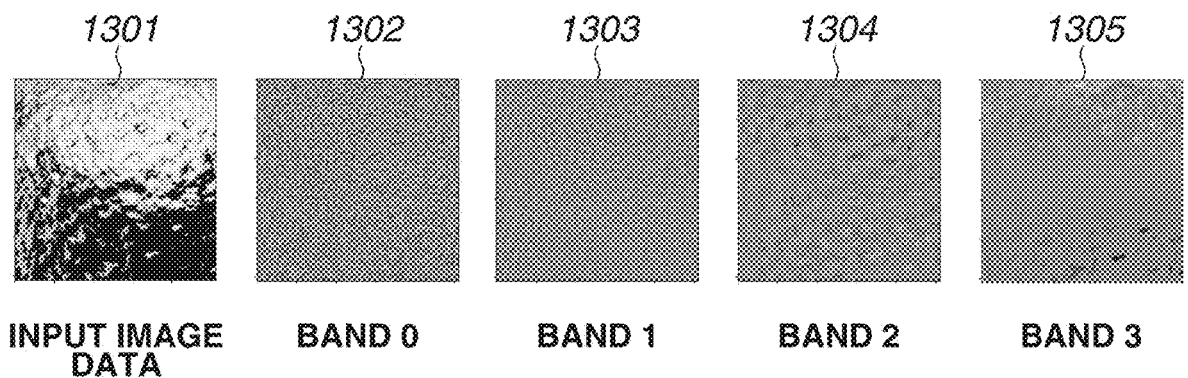
FIG. 13 is a diagram illustrating images of the respective bands according to the first exemplary embodiment.

FIG. 13 illustrates an example in which the band resolving is performed on an actual image of "orange" of the fruit. As with FIG. 6, image data 1302 to 1305 indicate image data of the band 0 to 3 that are obtained by resolving image data 1301 as the input image data by the band resolving unit 303.

The band resolution corresponds to a difference of image data obtained by performing processing using the smoothing filters on the input image data. Accordingly, each band includes a negative value. In this example, the image data 602 to 605 are corrected to positive values of 8 bits (0 to 255) in order to facilitate visual understanding. Further, although not illustrated, the band resolving is similarly performed on the image data of the R channel and the image data of the G channel. The method of the band resolving is described above and its description is omitted.

Figure 9:
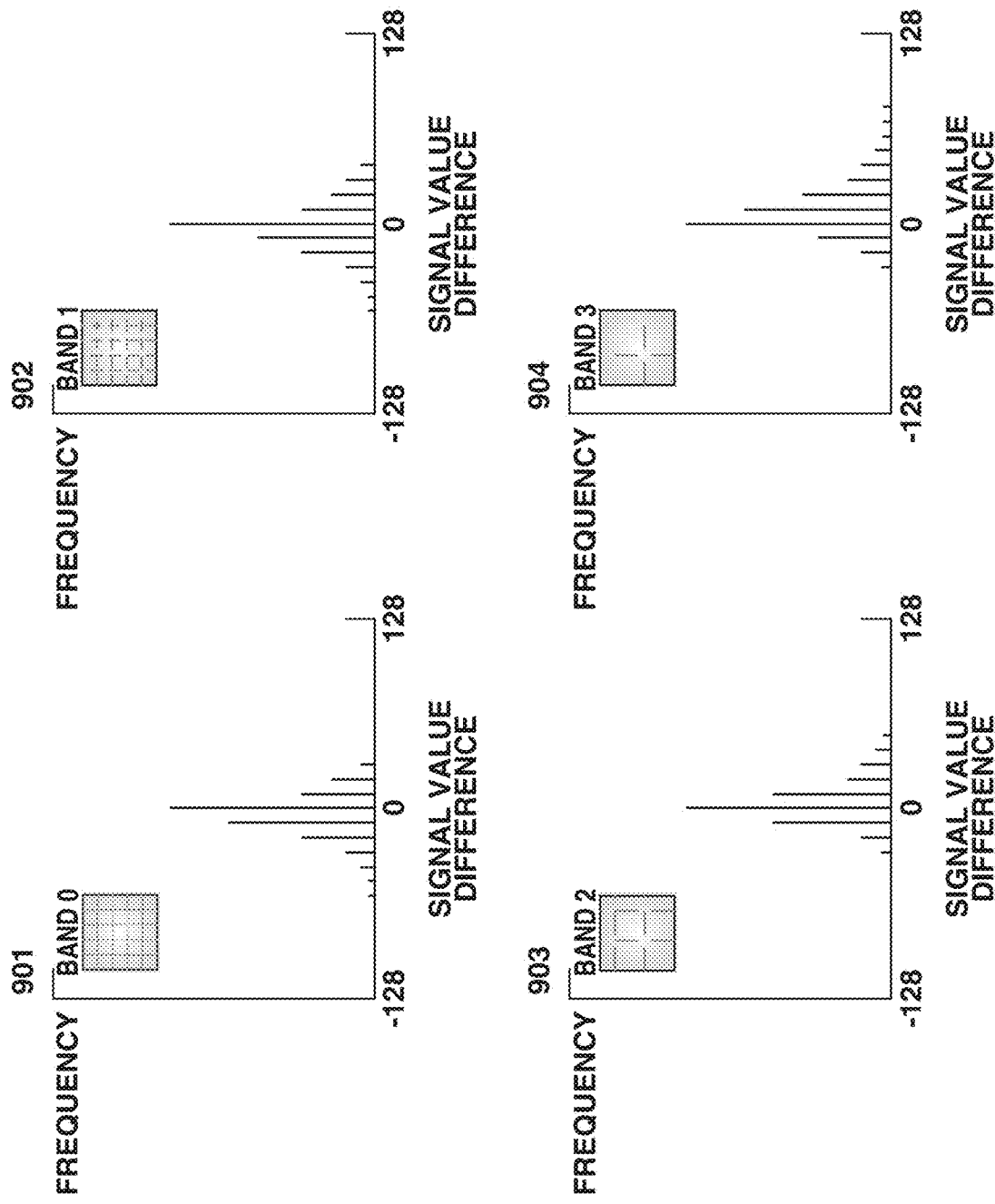
FIG. 9 is a diagram illustrating histograms of respective bands according to the first exemplary embodiment.

Next, in step S404, the histogram generation unit 304 generate a histogram with respect to the image data of each band resolved in step S403. In other words, the histogram is generated from the image data of each band in FIG. 6. Histograms 901 to 904 illustrated in FIG. 9 are histograms respectively generated from image data of the bands 0 to 3 in FIG. 6. In this example, a lateral axis indicates a signal value difference and has a range of −128 to +128. Further, a vertical axis indicates a frequency of an image signal value.

It can be seen that the histograms acquired from the image data of the band 0 and the image data of the band 1 in the high-frequency band are skewed in a negative direction, and the histograms acquired from the image data of the band 2 and the image data of the band 3 in the low-frequency band are skewed in a positive direction.

Figure 7:
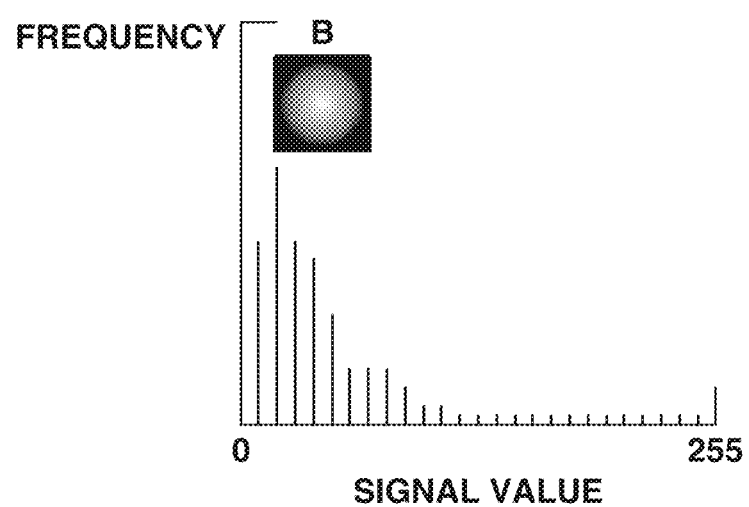
FIG. 7 is a diagram illustrating a histogram of a B channel of the input image according to the first exemplary embodiment.

As a comparison, FIG. 7 illustrates a histogram acquired from the input image data 601 before the band resolving is performed in FIG. 6. As illustrated in FIG. 7, the histogram acquired from the image data before the band resolving is skewed in a positive direction. As illustrated in FIG. 9, however, it can be seen from the histograms acquired from the image data of the respective bands that the input image data includes the image data of the bands 0 and 1 skewed in the negative direction and the image data of the bands 2 and 3 skewed in the positive direction.

Next, in step S405, the skewness calculation unit 305 acquires skewness from each of the histograms generated in step S404. The method of acquiring the skewness is as described above. FIG. 10 illustrates skewness acquired from the respective histograms 901 to 904 in FIG. 9. As described above, it can be seen that the skewness corresponding to the image data of the bands 0 and 1 of the histogram skewed in the negative direction has a negative value, and the skewness corresponding to the image data of the bands 2 and 3 of the histogram skewed in the positive direction has a positive value.

Next, in step S406, the gloss determination unit 306 determines whether the image data to be processed includes a gloss region, based on the skewness acquired in step S405. In the present exemplary embodiment, since the band resolving is performed in step S403, it is determined whether the image data of each band includes a gloss region in the image data to be processed. When the skewness has a positive value, it may be determined that the image data to be processed includes a gloss region. When the skewness has a negative value, it may be determined that the image data to be processed does not include a gloss region. Further, a threshold of the skewness used for the gloss determination may be optionally changed depending on a state of the printer unit in the image processing apparatus or a kind of a sheet or toner to be used. Further, it may be determined that the image data of the band having the highest skewness includes a gloss region.

In the present exemplary embodiment, it is determined in step S407 that the image data to be processed includes a gloss region when the skewness is larger than a predetermined threshold, and it is determined in step S408 that the image data to be processed does not include a gloss region when the skewness is equal to or lower than the predetermined threshold. For example, when the predetermined threshold is set to "1.0", the gloss determination unit 306 determines that the image data of the band 3 includes a gloss region and the image data of the bands 0 to 2 does not include a gloss region, through comparison with the skewness in FIG. 10.

Next, in step S409, the gain adjustment unit 307 determines the image data of the band that has been determined in step S407 as including a gloss region, as a process target, and performs the gain adjustment on the image data.

In step S406, it is determined that the image data of the band 3 includes a gloss region. Accordingly, the gain adjustment unit 307 performs the gain adjustment of the image data of the band 3 by multiplying the image data by a predetermined coefficient based on the setting value "−2" to "+2" of the gloss adjustment indicated on the UI screen in FIG. 12. For example, when the setting value is "+2", the gain adjustment unit 307 multiplies the image data of the band 3 by a coefficient "1.4". On the other hand, the gain adjustment is not performed on the image data of the bands 0 to 2 that has been determined as not including a gloss region in step S408.

Figure 14:
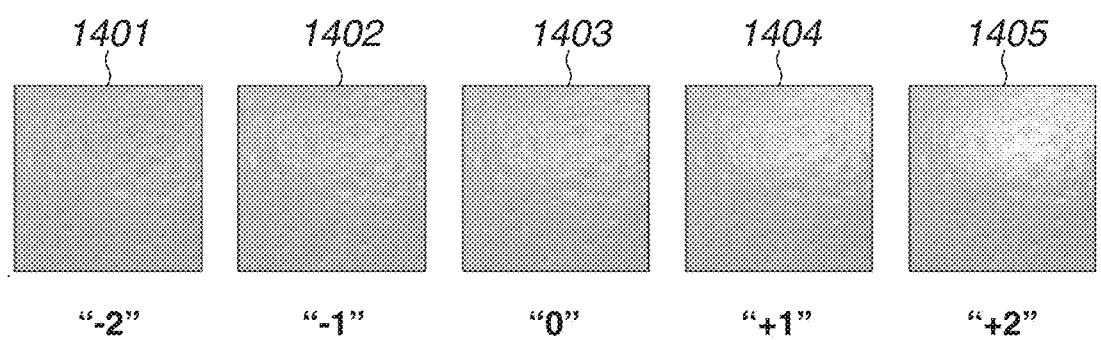
FIG. 14 is a diagram illustrating resultant images after gloss adjustment according to the first exemplary embodiment.

FIG. 14 illustrates examples of a resultant image after the gloss adjustment is performed on the input image data.

Images 1401 to 1405 in FIG. 14 are resultant images when the setting values "−2" to "+2" are selected, respectively, and are output images after band synthesis described below.

It can be seen that, when the setting value "+1" or "+2" is designated, the image 1404 or the image 1405 is generated and glossiness of the gloss region is increased. In contrast, it can be seen that, when the setting value "−2" or "−1" is designated, the image 1401 or the image 1402 is generated and glossiness of the gloss region is reduced.

Next, in step S410, the band synthesizing unit 308 synthesizes the image data of the band subjected to the gain adjustment in step S409, the image data of the band determined as not including a gloss region in step S408, and the reference image data obtained through the band resolving by the band resolving unit 303. The synthesized image data is generated as the output image data.

As described above, when the gloss control is performed on the image data to be processed for each frequency band, the gain adjustment is performed on the band requiring the gain adjustment of the image to be processed, and the gain adjustment is not performed on the band not requiring the gain adjustment. This allows for the gloss control with high precision.

In the present exemplary embodiment, the band resolving is performed on the image data including all channels resolved by the channel resolving unit 302, to resolve the image data into the image data of the plurality of different frequency bands. The band resolving, however, is not limited thereto, and the band resolving may be performed only on the image data including a channel determined as including a gloss region, after the channel resolving is performed.

As a result, the band resolving is performed on the image data of each resolved channel, which makes it possible to accelerate the processing as compared with a case where the gloss determination processing and the gloss control are performed on the image data of each resolved band.

A second exemplary embodiment is described below. In the first exemplary embodiment, the example has been described in which the gain adjustment is performed on the image data of the frequency band including the skewness larger than the predetermined threshold, with respect to the image data to be subjected to the gloss control, to enable the gloss control with high precision.

Figure 18:
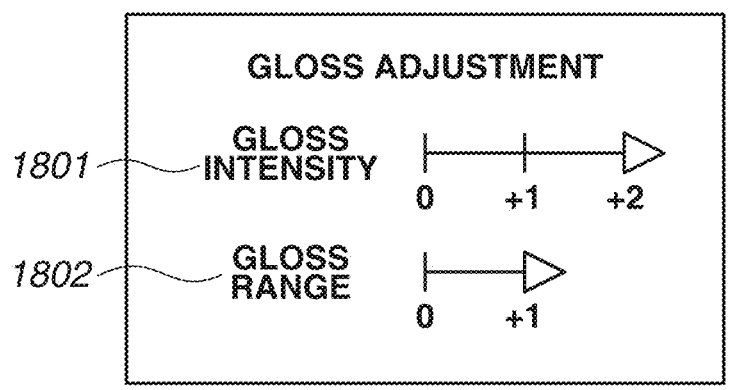
FIG. 18 is a UI screen for gloss adjustment according to the second exemplary embodiment.

In the second exemplary embodiment, "gain adjustment" and "range adjustment" are performed based on setting of "gloss intensity" and "gloss range" designated by the operator through an UI for gloss adjustment in FIG. 18 as described below. This makes it possible to perform the gloss adjustment on the image data more precisely in order to represent the glossiness intended by the user when the input image is output.

Figure 15:
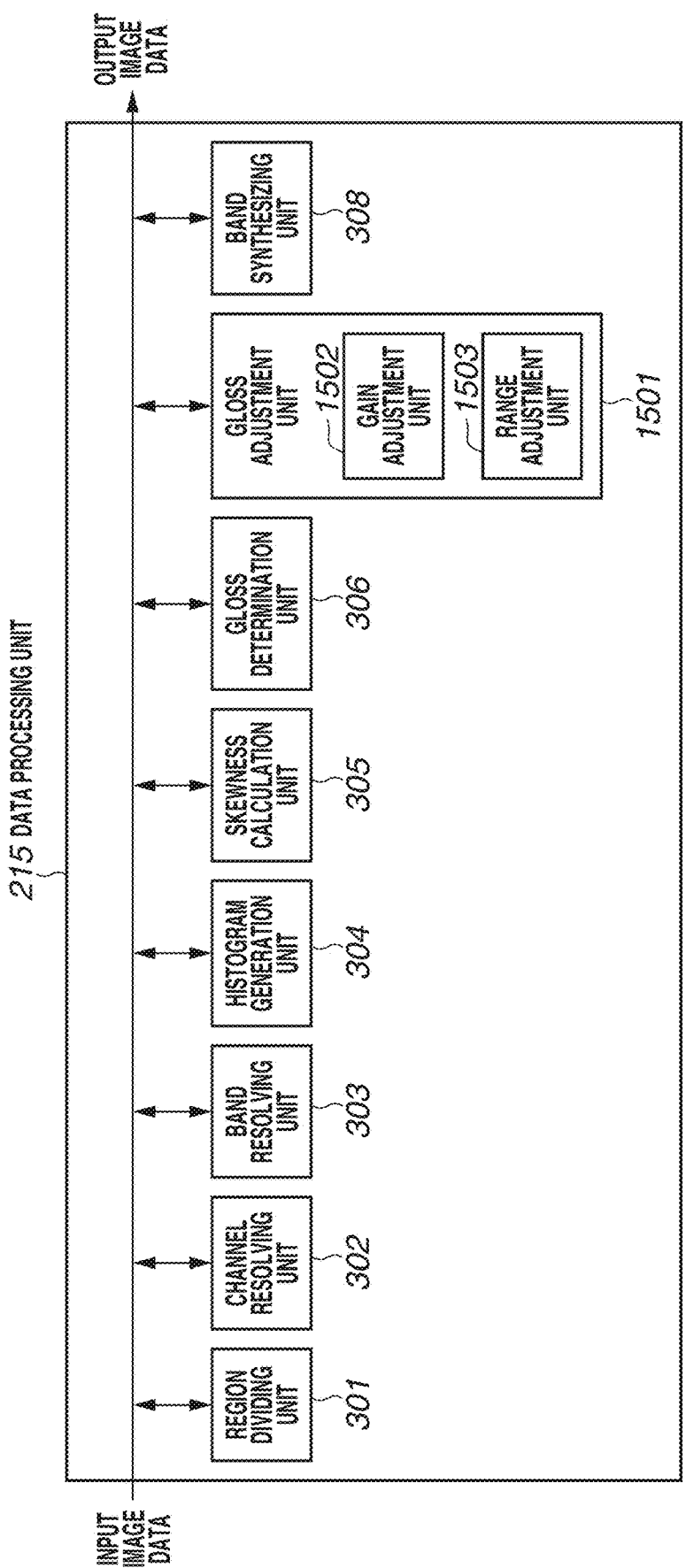
FIG. 15 is a block diagram illustrating a data processing unit 215 according to a second exemplary embodiment and a third exemplary embodiment.

First, a block diagram according to the second exemplary embodiment is described with reference to FIG. 15. Description of the parts already described in the first exemplary embodiment is omitted. A difference from FIG. 3 is a gloss adjustment unit 1501. The gloss adjustment unit 1501 includes a gain adjustment unit 1502 and a range adjustment unit 1503.

The gain adjustment unit 1502 adjusts the image signal value of the pixel to be processed, by multiplying the image data of the frequency band including the skewness higher than the predetermined threshold by the predetermined coefficient, in a manner similar to the gain adjustment unit 307 described in the first exemplary embodiment.

The range adjustment unit 1503 performs adjustment by fixing the gain coefficient and increasing the number of processed bands to be multiplied by the gain coefficient. In other words, out of the band-resolved image data, the number of pieces of image data to be multiplied by the gain coefficient is increased. For example, in a case where the band of the image data is resolved into the bands 0 to 3 by the band resolving unit 303, the maximum number of processed bands becomes "4" (number of pieces of image data to be processed is four). When the number of bands to be processed is increased in the above-described manner, the number of pieces of image data to be processed out of the band-divided image data is increased. This makes it possible to increase the number of pixels as targets of the gain adjustment out of the pixels configuring the input image. In other words, a region (range) of the input image where the gloss is adjusted becomes larger.

Next, the UI screen for the gloss adjustment according to the second exemplary embodiment is described with reference to FIG. 18. The UI screen is displayed on the operation unit 203 in FIG. 2.

A UI of "gloss intensity" 1801 is a UI for adjusting the image signal value of the pixel to be processed, by the gain adjustment unit 1502. FIG. 20A illustrates examples of the coefficient for the gain adjustment corresponding to the setting values "0" to "+2".

A UI of "gloss range" 1802 is a UI for adjusting through increase of the number of bands to be processed, by the range adjustment unit 1503. FIG. 20B illustrates examples of the number of processed bands corresponding to the setting values "0" and "+1".

When the gloss range is set to "0", the number of processed bands is "1", and the band to be processed is "band of the highest skewness". For example, in a case where the skewness for the respective bands illustrated in FIG. 10 are obtained, when the threshold of the skewness used for the gloss determination is set to "0", it is determined that the image data of the band 2 and the image data of the band 3 include a gloss region. The image data of the band of the highest skewness is the image data of the band 3, and the image data of the band 3 becomes the target image data of the band to be multiplied by the gain coefficient.

When the gloss range is set to "+1", the number of processed bands is "2", and the band to be processed includes "band of the highest skewness" and "band adjacent to band of the highest skewness".

Likewise, in the case where the skewness for the respective bands illustrated in FIG. 10 are obtained, the image data of two bands, namely, the image data of the band 3 and the image data of the band 2 become the target image data to be multiplied by the gain coefficient.

Next, a flowchart according to the second exemplary embodiment is described with reference to FIG. 16.

Figure 16:
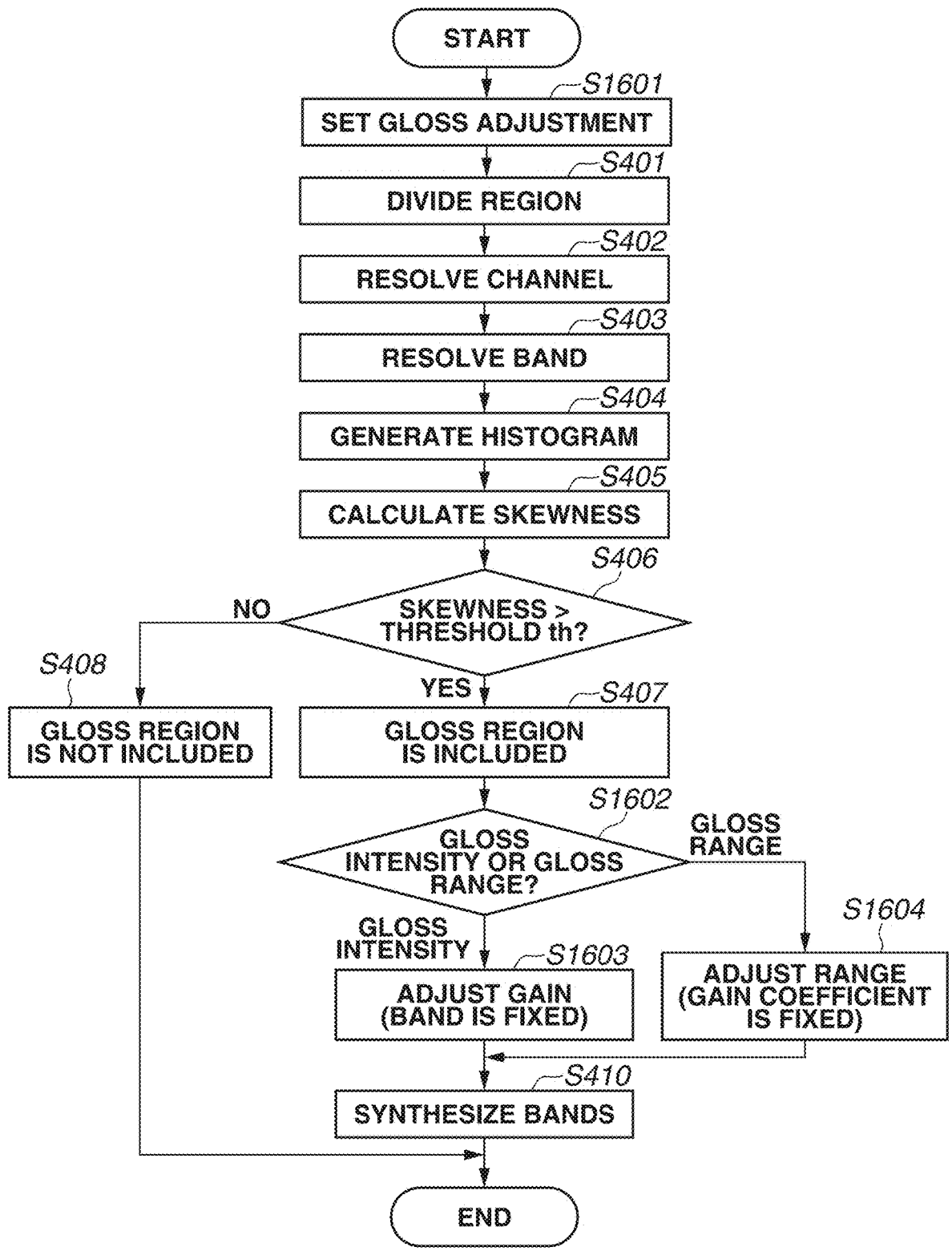
FIG. 16 is a flowchart according to the second exemplary embodiment.

FIG. 16 is a flowchart to describe the gloss determination and the gloss control by the data processing unit 215. A program executing the flowchart is stored in the ROM 210 or the storage unit 211 in FIG. 2, and is executed by the CPU 205. The CPU 205 can exchange data with the data processing unit 215 through the image bus interface 212, the system bus 216, and the image data bus 217. Description of the parts already described with reference to FIG. 4 in the first exemplary embodiment is omitted.

First, in step S1601, the operation unit 203 receives a setting instruction of the gloss adjustment by the operator, more specifically, receives a setting instruction of "gloss intensity" and "gloss range" described with reference to FIG. 18.

Next, the processing in steps S401 to S408 described with reference to FIG. 4 are performed.

Next, in step S1602, the gloss adjustment unit 1501 determines whether the setting received by the operation unit 203 in step S1601 is a setting for "gloss intensity" or "gloss range".

In a case where "gloss intensity" is set (gloss intensity in step S1602), the gain adjustment unit 1502 adjusts the image signal value of the pixel to be processed through multiplication by a predetermined coefficient in step S1603.

In a case where "gloss range" is set (gloss range in step S1602), the range adjustment unit 1503 performs the adjustment, in step S1604, by fixing the gain coefficient and increasing the number of bands to be processed out of the band-resolved image data.

In a case where both of "gloss intensity" and "gloss range" are set, both of the gain adjustment in step S1603 and the range adjustment in step S1604 are performed (not illustrated).

Next, the processing in step S410 described above with reference to FIG. 4 is performed.

According to the second exemplary embodiment, "gain adjustment" and "range adjustment" are performed based on the setting of "gloss intensity" or "gloss range". In other words, the gain coefficient used in the gloss adjustment and the number of pieces of image data to be adjusted out of the band-resolved image data are changeable. This makes it possible to precisely perform the gloss adjustment on the image data as the target of the gloss control in order to express the glossiness intended by the user.

A third exemplary embodiment is described below. In the third exemplary embodiment, a method of performing the gloss adjustment while suppressing white void caused by the gain adjustment, based on the setting of "gloss adjustment" designated by the operator through a UI for the gloss adjustment in FIG. 19 described below, is described.

For example, when the gloss adjustment is set to "0", "+1", or "+2", the gloss is stepwisely increased through the gain adjustment. Images 2001 to 2003 in FIG. 21 respectively correspond to the setting of the gloss adjustment of "0", "+1", and "+2", and illustrate states where the gloss is stepwisely increased through the gain adjustment.

When the gloss adjustment is set to "+3", the number of white-saturated pixels is increased, which results in an unfavorable image including white void. An image 2104 in FIG. 21 illustrates a state where white void occurs on the gloss-adjusted image due to the gain adjustment.

Accordingly, in a case where the number of the white-saturated pixels becomes larger than a predetermined threshold, the number of bands to be adjusted (number of pieces of image data of band to be processed out of band-resolved image data) is adjusted without increasing the coefficient of the gain adjustment. Thus, the gloss adjustment is performed while suppressing white void caused by the gain adjustment.

Figure 21:
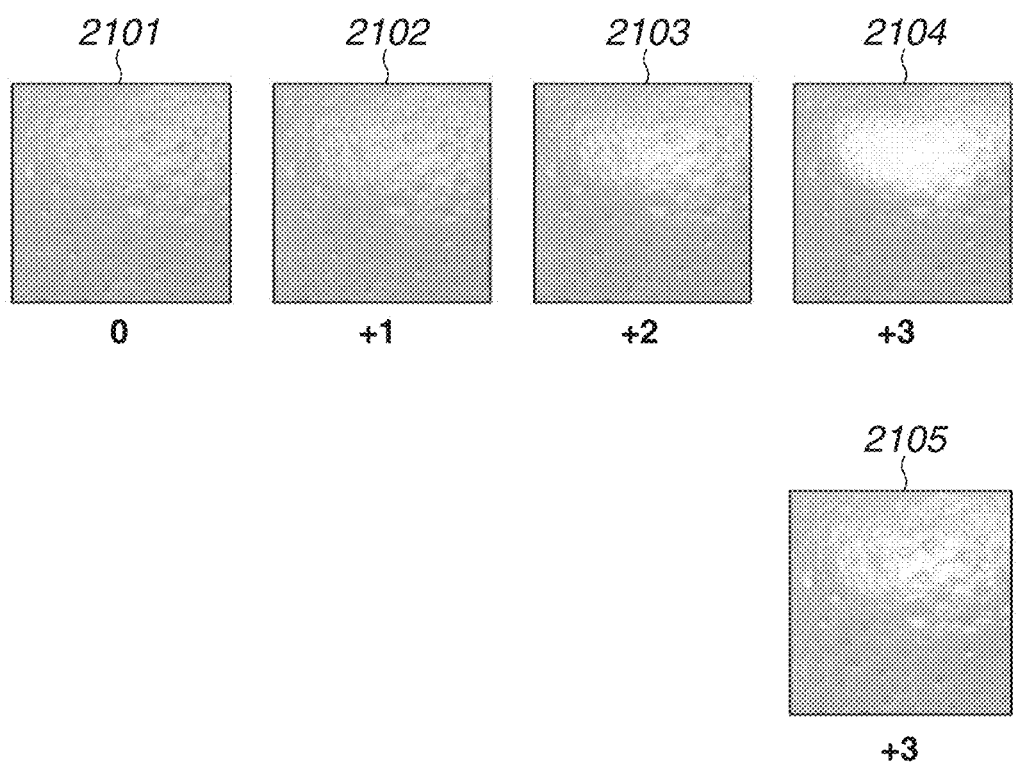
FIG. 21 is a diagram illustrating resultant images after the gloss adjustment according to the second exemplary embodiment and the third exemplary embodiment.

An image 2105 in FIG. 21 corresponds to the setting "+3" of the gloss adjustment, and illustrates a state where the range adjustment is performed while the gain coefficient is fixed to the coefficient for the setting "+2" of the gloss adjustment.

Figure 19:
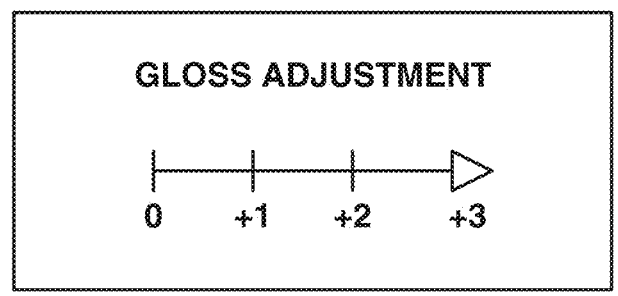
FIG. 19 is a UI screen for gloss adjustment according to the third exemplary embodiment.

Next, a UI screen for the gloss adjustment according to the third exemplary embodiment is described with reference to FIG. 19. The UI screen is displayed on the operation unit 203 in FIG. 2.

FIGS. 20C and 20D illustrate examples of the coefficients for the gain adjustment corresponding to the setting values "0" to "+3" and the band range of the image data (number of processed bands) as the target of the gain adjustment. FIG. 20C illustrates initial values of relationship between the setting value of the gloss adjustment, the gain coefficient, and the number of processed bands. FIG. 20D illustrates a case where the number of white-saturated pixels becomes larger than the predetermined threshold when the gloss adjustment is set to "+3". More specifically, when the gloss adjustment is set to "+3" and an initial value "1.6" of the gain coefficient is used, the number of white-saturated pixels becomes larger than the predetermined threshold. Accordingly, the number of processed bands is increased to "2" while the gain coefficient is fixed to "1.4" as with the case where the gloss adjustment is set to "+2".

Next, a flowchart according to the third exemplary embodiment is described with reference to FIG. 17.

Figure 17:
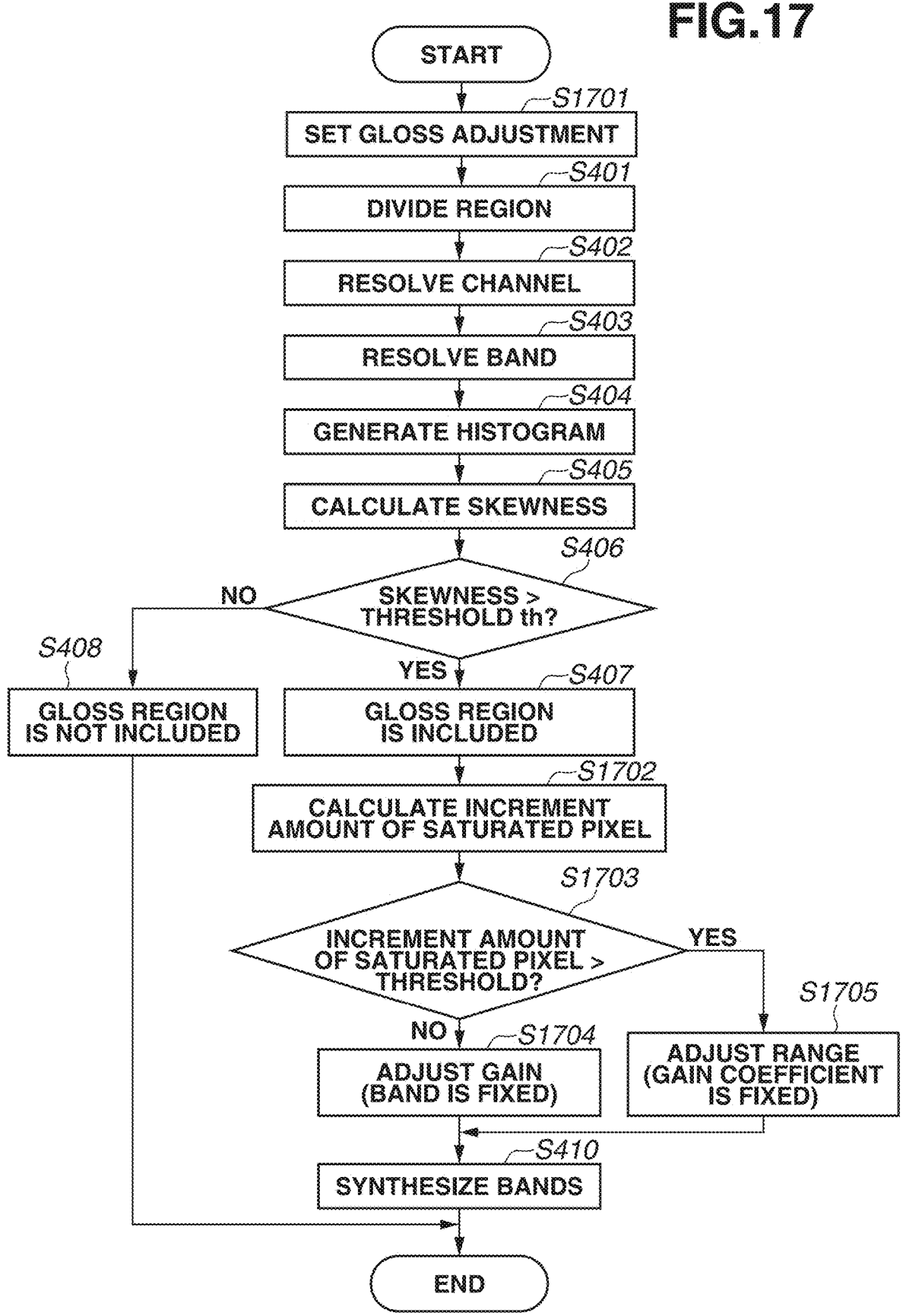
FIG. 17 is a flowchart according to the third exemplary embodiment.

FIG. 17 is a flowchart for describing the gloss determination and the gloss control by the data processing unit 215. A program executing the flowchart is stored in the ROM 210 or the storage unit 211 in FIG. 2, and is executed by the CPU 205. The CPU 205 can exchange data with the data processing unit 215 through the image bus interface 212, the system bus 216, and the image data bus 217. Description of the parts already described with reference to FIG. 4 in the first exemplary embodiment is omitted.

First, in step S1701, the operation unit 203 receives the setting instruction of the gloss adjustment by the operator described above with reference to FIG. 18.

Next, the processing in step S401 to S408 described above with reference to FIG. 4 are performed.

Next, in step S1702, the gloss adjustment unit 1501 calculates an increment amount of the saturated pixels in a region that has been determined as the gloss region in step S407, from the setting value of the gloss adjustment in step S1701 and the coefficient for the gain adjustment.

The calculation of the increment amount of the saturated pixels is described with reference to FIGS. 22A to 22C. The description is made with use of simple values to facilitate understanding of the description.

FIG. 22A illustrates a histogram (relationship between signal value and frequency) of the region determined as the gloss region, before the gain adjustment is performed. In this example, a signal value 0 corresponds to a black pixel, and a signal value 255 corresponds to a white pixel. In this case, the frequency of the white pixel before the gain adjustment is 100.

FIG. 22B illustrates a histogram (relationship between signal value and frequency) after the gain adjustment with the gain coefficient of 1.2 is performed on the image data.

The frequency of the white pixel after the gain adjustment is 100 that is the same as the frequency before the gain adjustment.

FIG. 22C illustrates a histogram (relationship between signal value and frequency) after the gain adjustment is performed with the gain coefficient of 1.6 on the image data. The frequency of the pixel with the signal value of 200 is 300 before the gain adjustment. When pixels configuring the image data are multiplied by the gain coefficient of 1.6, all the signal values of the pixels become 255. As a result, the frequency of the white pixel after the gain adjustment becomes 400 in total, by adding 100 for the white pixel before the gain adjustment.

Accordingly, in the example in FIGS. 22A to 22C, the increment amount of the saturated pixels is "0" when the gain coefficient is 1.2 and is "300" when the gain coefficient is 1.6.

When the predetermined threshold for determining the increment amount of the saturated pixels is set to 200, the gain adjustment is performed when the gain coefficient is 1.2, and the band adjustment is performed when the gain coefficient is 1.6.

The increment amount of the saturated pixels is determined based on the increment amount of the frequency of the white pixels in the present case; however, the determination of the increment amount is not limited thereto. For example, the determination may be made based on a ratio of the white pixels to the region determined as the gloss region.

Next, in step S1703, the gloss adjustment unit 1501 determines whether the increment amount of the saturated pixels calculated in step S1702 is larger than the predetermined threshold.

In a case where the increment amount is equal to or lower than the threshold (NO in step S1704), the gain adjustment unit 1502 adjusts the image signal value of the pixel to be processed through multiplication by a predetermined coefficient in step S1704. In a case where the increment amount is larger than the threshold, the range adjustment unit 1503 performs the adjustment, in step S1705, by fixing the gain coefficient and increasing the number of processed bands.

Next, the processing in step S410 described above with reference to FIG. 4 is performed.

According to the third exemplary embodiment, it is possible to perform the gloss adjustment on the image data as the target of the gloss control based on the setting of "gloss adjustment" while suppressing white void caused by the gain adjustment.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2017-178107, filed Sep. 15, 2017, and No. 2018-065506, filed Mar. 29, 2018, which are hereby incorporated by reference herein in their entirety.

What is claimed is:

1. An apparatus, comprising:
a dividing unit configured to divide an input image into images respectively representing frequency bands of the input image;
an acquisition unit configured to acquire skewness of a histogram of each of the images representing a frequency band of the input image; and
a determining unit configured to determine an image to be adjusted from the images based on the acquired skewness; and
an adjustment unit configured to perform gain adjustment on the image determined to be adjusted.

2. The apparatus according to claim 1, further comprising:
a synthesizing unit configured to synthesize at least an image obtained by performing gain adjustment using the adjustment unit on the image determined to be adjusted from the images respectively representing the frequency bands of the input image, and the image determined not to be adjusted from the images respectively representing the frequency bands of the input image; and
an output unit configured to output the synthesized image data.

3. The apparatus according to claim 1, wherein the input image is divided into components of R, G and B, and the dividing unit performs dividing on each of the components.

4. The apparatus according to claim 1, wherein the input image is respectively divided into at least two color components.

5. The apparatus according to claim 1, wherein the dividing unit divides the input image into the images respectively representing the frequency bands of the input image with use of smoothing filters.

6. The apparatus according to claim 1, wherein the histogram is frequency distribution indicating frequencies of pixels with respect to image signal values of the input image.

7. The apparatus according to claim 1, wherein the skewness of the histogram is a value indicating a degree of skew of the histogram.

8. The apparatus according to claim 1, wherein the adjustment unit performs the gain adjustment by multiplying each of the frequency bands by a predetermined coefficient in a case where the skewness calculated for each of the frequency bands is larger than a predetermined threshold.

9. The apparatus according to claim 1, wherein a gain coefficient used when the gain adjustment is performed on the image by the adjustment unit can be changed.

10. The apparatus according to claim 9, further comprising a display control unit configured to perform display to previously designate the gain coefficient.

11. The apparatus according to claim 1, wherein number of images to be adjusted, out of the images representing the frequency bands of the input image, can be changed based on the acquired skewness.

12. The apparatus according to claim 11, further comprising a display control unit configured to perform display to previously designate number of images.

13. The apparatus according to claim 1, further comprising a control unit configured to control a gain coefficient used when the gain adjustment is performed on the image to be adjusted and to control number of images to be adjusted,
wherein the control unit determines the gain coefficient in the gain adjustment and the number of images to be adjusted, with use of a result of a comparison between number of white pixels included in the image determined to be adjusted before the adjustment is performed and the number of white pixels included in the image determined to be adjusted after the adjustment is performed.

14. The apparatus according to claim 1, wherein the adjustment unit does not perform gain adjustment on at least one image other than the image determined to be adjusted from the images.

15. A method for controlling an apparatus, the method comprising:
dividing an input image into images respectively representing frequency bands of the input image;
acquiring skewness of a histogram of each of the images representing a frequency band of the input image; and
determining an image to be adjusted from the images based on the acquired skewness; and
performing gain adjustment on the image determined to be adjusted.

16. The method according to claim 15, further comprising:
synthesizing, at least an image obtained by performing gain adjustment on the image determined to be adjusted from the images respectively representing the frequency bands of the input image, and the image determined not to be adjusted from the images respectively representing the frequency bands of the input image; and
outputting the synthesized image data.

17. The method according to claim 15, wherein the input image is divided into components of R, G and B, and the dividing is performed on each of the components.

18. The method according to claim 15, wherein gain adjustment on at least one image other than the image determined to be adjusted from the images.

19. A non-transitory storage medium which stores a computer program for making a computer function as respective units of an apparatus, the apparatus comprising:
a dividing unit configured to divide an input image into images respectively representing frequency bands of the input image;
an acquisition unit configured to acquire skewness of a histogram each of the the images representing a frequency band of the input image; and
a determining unit configured to determine an image to be adjusted from the images based on the acquired skewness; and
a performing unit configured to perform gain adjustment on the image determined to be adjusted.

20. The non-transitory storage medium according to claim 19, further comprising:
synthesizing at least an image obtained by performing gain adjustment on the image determined to be adjusted from the images respectively representing frequency bands of the input image, and the image determined not to be adjusted from the images respectively representing the frequency bands of the input image; and
outputting the synthesized image data.

21. The non-transitory storage medium according to claim 19, wherein the input image is divided into components of R, G and B, and the dividing is performed on each of the components.

22. The non-transitory storage medium according to claim 19, wherein gain adjustment on at least one image other than the image determined to be adjusted from the images.

23. An apparatus, comprising:
a dividing unit configured to divide an input image into images respectively representing frequency bands of the input image;
an acquisition unit configured to acquire skewness of a histogram each of the images representing a frequency band of the input image; and
an adjustment unit configured to perform gain adjustment on the input image based on the acquired skewness.

24. The apparatus according to claim 23, further comprising:
a synthesizing unit configured to synthesize at least an image obtained by performing gain adjustment using the adjustment unit from the images respectively representing the frequency bands of the input image, and the image data determined not to be adjusted from the images respectively representing the frequency bands of the input image; and
an output unit configured to output the synthesized image data.

* * * * *